United States Patent
Lamm et al.

(10) Patent No.: US 6,521,366 B1
(45) Date of Patent: Feb. 18, 2003

(54) FUEL CELL SYSTEM

(75) Inventors: Arnold Lamm, Elchingen (DE); Norbert Wiesheu, Guenzburg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/512,813

(22) Filed: Feb. 25, 2000

(30) Foreign Application Priority Data

Feb. 25, 1999 (DE) .......................... 199 08 099

(51) Int. Cl.$^7$ ................................ H01M 8/04
(52) U.S. Cl. .................. 429/26; 429/19; 429/20
(58) Field of Search ................ 429/17, 19, 20, 429/26

(56) References Cited

U.S. PATENT DOCUMENTS

| | | | |
|---|---|---|---|
| 3,973,993 A | * | 8/1976 | Bloomfield et al. .......... 429/17 |
| 5,981,096 A | * | 11/1999 | Hornburg et al. ............ 429/17 |
| 6,007,931 A | * | 12/1999 | Fuller et al. .................. 429/13 |

FOREIGN PATENT DOCUMENTS

| | | |
|---|---|---|
| DE | 196 28 888 C1 | 1/1998 |
| DE | 196 29 084 C2 | 1/1998 |
| DE | 196 29 084 A1 | 1/1998 |
| DE | 197 01 560 | 7/1998 |
| DE | 197 22 598 A1 | 12/1998 |
| EP | 0 741 428 | 11/1996 |
| JP | 56-97972 | 8/1981 |

* cited by examiner

*Primary Examiner*—Patrick Ryan
*Assistant Examiner*—Jonathan Crepeau
(74) *Attorney, Agent, or Firm*—Crowell & Moring LLP

(57) ABSTRACT

Fuel cell system has an anode chamber and a cathode chamber separated from one another by a proton-conducting membrane. A cathode supply line supplies gas containing oxygen to the cathode chamber, and an anode supply line supplies a liquid coolant/fuel mixture to the anode chamber. The anode chamber is located in an anode circuit that includes a gas separator and a pump, and with a cooler and a water separator being located in the separated gas flow from the gas separator in the flow direction. According to the invention, the anode circuit has an operating pressure of at least 2.5 bars. The cooler is also cooled by a medium at ambient temperature.

4 Claims, 1 Drawing Sheet

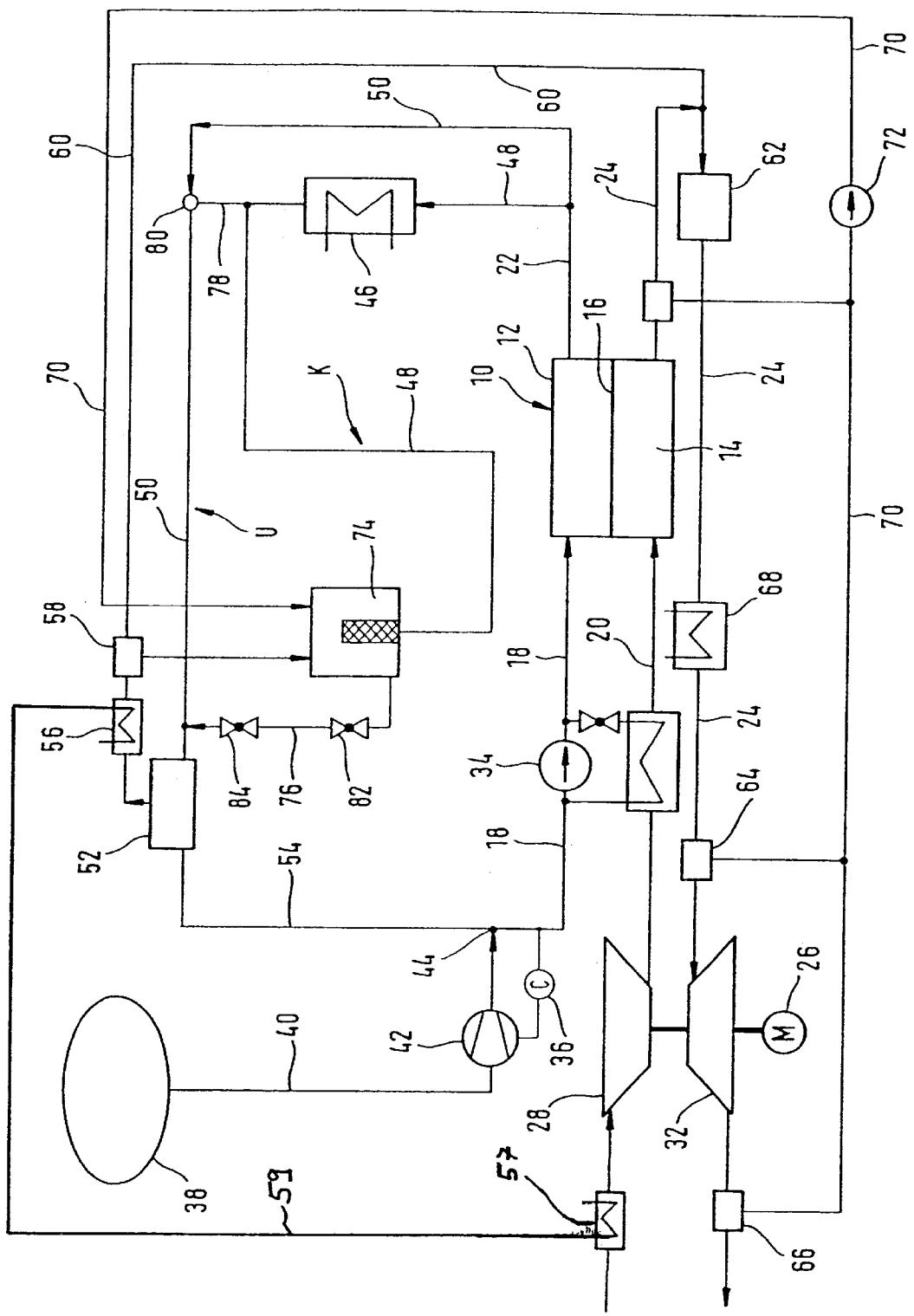

FUEL CELL SYSTEM

BACKGROUND AND SUMMARY OF THE INVENTION

This application claims the priority of German patent document 199 08 099.2, filed Feb. 25, 1999, the disclosure of which is expressly incorporated by reference herein.

The invention relates to a fuel cell system with an anode chamber and a cathode chamber separated from one another by a proton-conducting membrane.

At the present time, the reformation of methanol in a gas generating system is used for running liquid energy carriers through fuel cell systems with proton exchange membranes (PEM fuel cells) throughout the world. In this process, a water/methanol mixture is evaporated and reacted in a reformer to form hydrogen, carbon dioxide, and carbon monoxide. Evaporation and reformation are very expensive as far as energy conversion is concerned, degrading efficiency for the total system. In addition, gas preparation steps are required to purify the reformation gas. The purified gas is then supplied to the PEM fuel cell system.

In systems that use water for reformation, the product water on the cathode does not suffice to cover the water requirement, so that a separate water tank is necessary.

A fuel cell system of the type described above, containing a liquid fuel/coolant mixture is disclosed in German patent document DE 197 01 560 A1. A gas separator for separating carbon dioxide from the fuel/coolant mixture and a circulating pump are provided in the anode circuit, as well as a device for metering fuel into the anode circulation. A cooler is provided in the separated gas flow downstream from another gas separator. The coolant offgas from the known fuel cell system, which contains oxygen and water vapor, is conducted through a water separator and the separated water is fed into the anode circulation.

One object of the invention is to provide a PEM fuel cell system which achieves improved overall efficiency.

This and other objects and advantages are achieved by the fuel cell system according to the invention, in which an anode chamber and a cathode chamber are separated from one another by a proton-conducting membrane, with a cathode supply line for supplying gas containing oxygen to the cathode chamber and an anode supply line for supplying a liquid coolant/fuel mixture to the anode chamber. The anode chamber is located in an anode circuit that includes a gas separator and a pump, and a cooler and a water separator are located in the separated gas flow from the gas separator in the flow direction. According to the invention, the anode circuit has an operating pressure of at least 2.5 bars. The cooler is also cooled by a medium at ambient temperature.

By operating the anode circuit according to the invention at an operating pressure of at least 2.5 bars and by charging the cooler with a medium at ambient temperature, and the maximum temperature drop produced thereby, a maximum amount of water or fuel is recovered from the hot vapor-rich anode offgas, optimizing the total efficiency of the fuel cell system.

Other objects, advantages and novel features of the present invention will become apparent from the following detailed description of the invention when considered in conjunction with the accompanying drawings.

BRIEF DESCRIPTION OF THE DRAWINGS

The single FIGURE shows in a schematic view the theoretical design of a fuel cell system according to the invention.

DETAILED DESCRIPTION OF THE DRAWINGS

The fuel cell system shown in the FIGURE includes a fuel cell 10 having an anode chamber 12 and a cathode chamber 14 separated from one another by a proton-conducting membrane 16. A liquid coolant/fuel mixture is supplied to anode chamber 12 through an anode supply line 18. Any substance with the general structural formula H—[—$CH_2O]_n$—Y with $1<n<5$ and Y=H or $Y=CH_3$ that is liquid at room temperature and electrically oxidizable can be used as fuel. The fuel cell system of the embodiment shown is operated with liquid methanol as fuel and water as the coolant. Although only the use of a water/methanol mixture is described in the following, the scope of protection of this application is not intended to be limited to this embodiment. In particular, fluids or Ionic or non-Ionic additives to water that protect against freezing can be used as coolants. Possible fuels include, for example branched versions of the above general formula, dimethoxymethane or trimethoxymethane for example.

A gas containing oxygen is fed into cathode chamber 14 through a cathode supply line 20. (In the embodiment shown, ambient air is used for this purpose.) In fuel cell 10, the fuel is oxidized at the anode and the atmospheric oxygen is reduced at the cathode. For this purpose, the proton-conducting membrane 16 is coated on the appropriate surfaces with a suitable catalyst. Protons can thus migrate from the anode side through proton-conducting membrane 16 and bond with the oxygen ions on the cathode side to form water. In this electrochemical reaction, a potential develops between the two electrodes. By connecting many such cells in parallel or in series to form a so-called stack, potentials and currents can be produced that are sufficient to drive a vehicle.

Carbon dioxide gas enriched with water and methanol is produced at the anode outlet. This mixture of liquid and gas is removed through an anode drain line 22 from anode chamber 12. Cathode exhaust air containing the remaining oxygen and water vapor is removed through a cathode exhaust gas drain line 24. To obtain good efficiency, the ambient air in cathode chamber 14 is prepared under pressure. For this purpose, a compressor 28 driven by an electric motor 26 is located in cathode supply line 20; the compressor draws in the desired air and compresses it to the required pressure. During operation with ambient air, an air filter (not shown) is provided upstream of compressor 28, preferably in the inlet area of cathode supply line 20. Some of the energy required to compress the ambient air can be recovered by an expander 32 located in cathode drain line 24. Preferably, compressor 28, expander 32, and electric motor 26 are mounted on a common shaft. The fuel cell power is controlled by controlling or regulating the compressor rpm and hence the available airflow.

On the anode side, the water/methanol mixture is circulated by a pump 34 at a specific pressure in order to provide a constant fuel surplus at the anode. According to the invention, the anode circulation is operated at elevated pressure (more than 2.5 bars). The ratio of water to methanol in anode supply line 18 is adjusted with the aid of a sensor 36 that measures the methanol concentration in anode supply line 18. The concentration of the water/methanol mixture is measured as a function of this sensor signal, with the liquid methanol being supplied from a methanol tank 38 through a methanol supply line 40 and injected by an injection nozzle 44 not shown in greater detail into anode supply line 18. The injection pressure is generated by an injection pump 42 located in methanol supply line 40. Thus a water/methanol mixture with a constant methanol concentration is constantly supplied to anode chamber 12.

The carbon dioxide enriched with methanol and water vapor must now be separated from the mixture of liquid and gas removed through anode drain line 22. For this purpose, the anode circuit is divided for example into a circulating circuit U and a cooling circuit K. In the embodiment shown, anode drain line 22 is divided for this purpose into a cooling line 48 and a circulating line 50.

Circulating line 50 leads to a gas separator 52 in which the carbon dioxide is separated. The water/methanol mixture remaining in gas separator 52 is recycled through a line 54 into anode supply line 18.

The damp carbon dioxide gas separated in gas separator 52 is cooled in a cooler 56 to a temperature that is as low as possible and additional methanol and water are condensed out in a water separator 58 located downstream. The remaining dry carbon dioxide containing a small amount of residual methanol is supplied through line 60 to cathode offgas line 24 where it is mixed with the air from the oxygen-rich cathode and reacted in an exhaust catalytic converter 62 located in cathode offgas Line 24 downstream of the point where line 60 enters, to form carbon dioxide and water vapor. In order to separate at least a portion of the water vapor as water from the cathode exhaust air, two additional water separators 64 and 66 are located in cathode offgas line 24, respectively upstream and downstream of expander 32. Expander 32 acts as a compact condensation turbine at whose outlet a portion of the water vapor condenses. In addition, the cathode exhaust air at the connection with offgas catalytic converter 62, is cooled down to a specific temperature by heat exchanger 68 and a temperature sensor located at heat exchanger 68 (not shown in greater detail). Only this combination of temperature regulation and a condensation turbine can guarantee a positive water level in the entire system. The water collected in water separators 64 and 66 is then fed through a return line 70 with an integrated feedback pump 72 into the cooling circuit described below.

In cooling circuit K, downstream of the anode outlet in cooling line 48, a cooler 46 is provided for cooling the liquid/gas mixture. The outlet of the cooler is connected through a continuation of cooling line 48 to an ion exchanger 74, which collects and cleans the water/methanol mixture coming from cooler 46 and from water separator 58 as well as the product water formed on the cathode side fed by return line 70 into the cooling stream. The outlet of ion exchanger 74 is supplied, through line 76 upstream of gas separator 52, to the circulating line 50 with a check valve 82 and a manual valve provided in line 76 in the flow direction.

Through line 50 of circulating circuit U the mixture is supplied to gas separator 52 where the carbon dioxide gas is separated as described above. The remaining water/methanol mixture is returned through line 54 to anode supply line 18 with fresh methanol being injected through injection pump 42. After the operating temperature is reached, thermostatic valve 80 is switched as a function of the temperature measured at the inlet of anode chamber 12 in such fashion that a given portion of the liquid/gas mixture runs through cooling circuit K and cooler 46.

Manual valve 84 located downstream of ion exchanger 74 is adjusted so that a certain quantity (10% for example) of the mixture flowing through cooler 46 is fed through ion exchanger 74. The remaining portion of the mixture is fed downstream of cooler 46 through line 78 and thermostatic valve 80 to the gas separator 52.

In order to run cooler 56 as efficiently as possible it must be operated with the largest possible temperature differentials. For this purpose, according to the invention it is cooled by a medium at ambient temperature, preferably being exposed to ambient air. This can be accomplished firstly by cooling it by the gas containing oxygen and fed into the cathode supply line, as shown schematically in the drawing, by cooler 57 located in cathode supply line 20 on the input side and by connecting line 59. If the system is integrated into a vehicle, for example an electric vehicle operated by fuel cells, cooler 56 can also be integrated into the ordinary vehicle cooling circuit and thus be exposed to the ambient air.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system comprising
   an anode chamber;
   a cathode chamber separated from the anode chamber by a proton-conducting membrane;
   a cathode supply line coupled to supply gas containing oxygen to cathode chamber; and
   an anode supply line coupled to supply a liquid cooling/fuel mixture to the anode chamber; wherein
      an anode circuit which includes said anode chamber and said anode supply line, and further comprises a gas separator and a pump;
      a first cooler and a first water separator disposed in a separated gas flow discharged from the gas separator, said first cooler being upstream of said first water separator in a gas flow direction;
      a second cooler disposed in said anode circuit to receive and cool a portion of fluids discharged from said anode chamber; and
      a second separator disposed downstream from said second cooler for collecting and cleaning a water methanol mixture from the second cooler, an output of said second separator being provided as an input to said first gas separator; wherein
      the anode circuit has an operating pressure of at least 2.5 bar; and
      the first cooler is cooled by a medium at ambient temperature.

2. The fuel cell system according to claim 1, wherein an output of said first water separator is provided as an input to said second separator, upstream thereof relative to a flow direction.

3. The fuel cell system according to claim 2, wherein gas output from said water separator is combined with an output flow from said cathode chamber and passed through additional water separators.

4. The fuel cell system according to claim 3, wherein water separated in said additional water separators is provided as an additional input to said second separator.

* * * * *